UNITED STATES PATENT OFFICE.

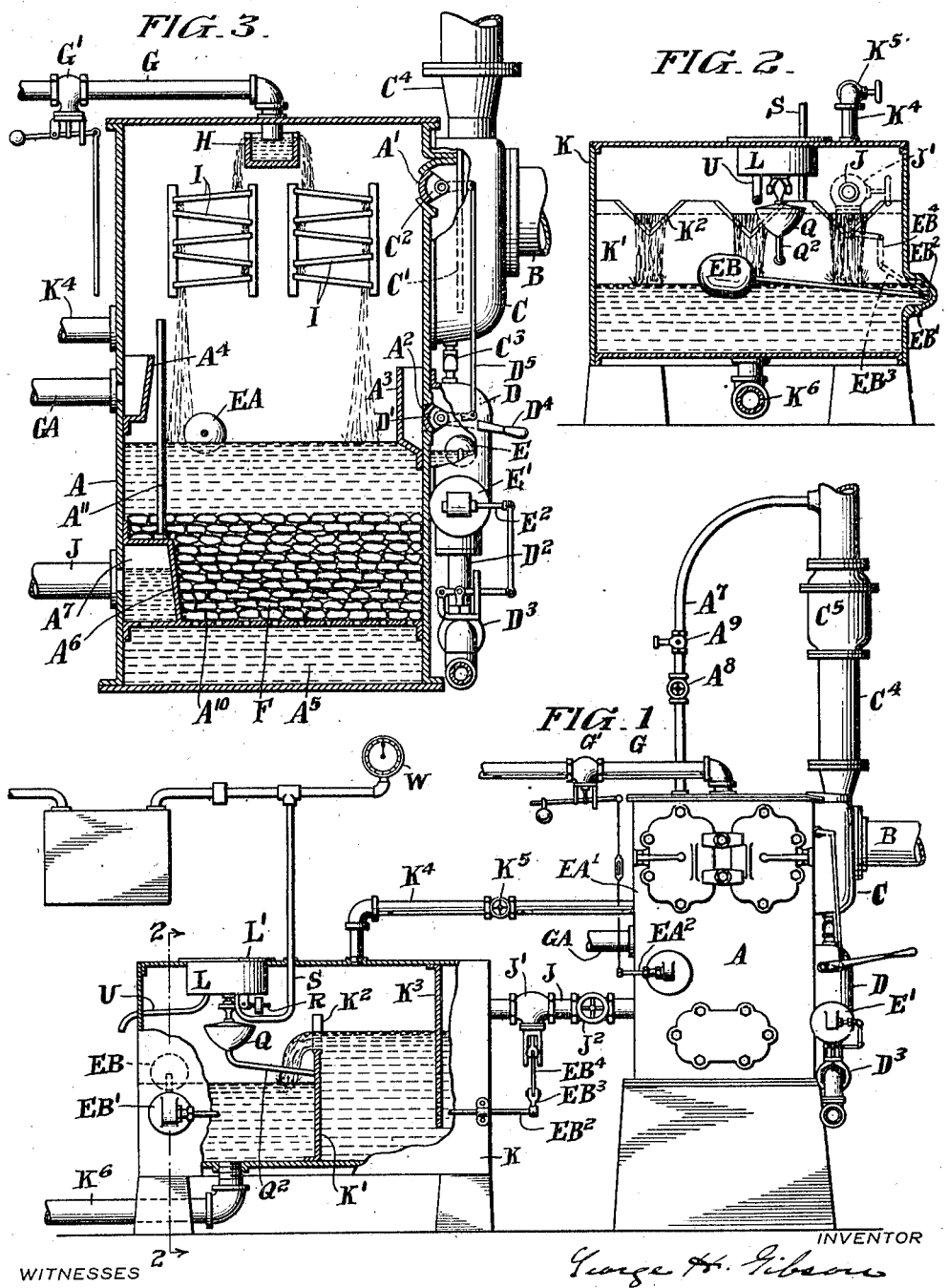

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS, OF PHILADELPHIA, PENNSYLVANIA.

COMBINED WATER HEATING AND MEASURING APPARATUS.

1,096,621. Specification of Letters Patent. Patented May 12, 1914.

Application filed January 12, 1912. Serial No. 670,862.

*To all whom it may concern:*

Be it known that I, GEORGE H. GIBSON, a citizen of the United States of America, residing in Montclair, county of Essex, in the State of New Jersey, have invented a certain new and useful Improvement in Combined Water Heating and Measuring Apparatus, of which the following is a true and exact description, reference being had to the accompanying drawings, which form a part thereof.

The primary object of the present invention is to provide a simple and effective combination of a water heater of common type with weir measuring apparatus for measuring water withdrawn from the heater.

In the preferred arrangement for carrying out the invention I employ as the water heater a so-called open feed water heater having storage capacity for heated water and the usual water supply regulating and overflow to waste provisions, and employ in conjunction therewith a weir chamber and coöperating flow measuring adjuncts, passing the heated water from the heater through the weir chamber to the boiler feed pump or other apparatus for utilizing the heated water. I employ means also for cutting off the supply of water to the weir chamber on a predetermined accumulation of water on the discharge side of the weir. When the normal service discharge from the heater is thus wholly or partially interrupted the water storage capacity of the heater and the water supply regulating and waste provisions of the heater are brought into full play The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described one form in which my invention may be embodied.

Of the drawings, Figure 1 is an elevation, partly broken away and in section of a combined water heating and measuring apparatus. Fig. 2 is a sectional elevation on the line 2—2 of Fig. 1. Fig. 3 is a sectional elevation of the heater shown in Fig. 1.

In the particular embodiment of my invention shown by the drawings, A, represents a so-called open feed water heater of common type in which water is heated by the direct action of steam injected into the heater and thereby condensed in whole or in part, the water of condensation mixing with the water passed into the heater to be heated and collecting in the bottom of the heater.

B, represents the pipe for supplying the heater with steam. The steam supplied is ordinarily the exhaust steam from steam engines.

C, represents an oil separator of common form and C' the baffle thereof. The oil separator C is interposed between the end of the pipe B and the upper end of the heater.

A' represents the port through which steam passes from the oil separator into the heating chamber. As shown, this port is controlled by a valve $C^4$.

$C^3$, represents a pipe for conveying liquid collecting in the bottom of the separator C into a float chamber D. The latter is open to the interior of the heater chamber through the port $A^2$ and surplus water accumulating in the heater may pass to waste through port $A^2$ when the water level in the heater rises to the top of the shell $A^3$ located within the heater. The port $A^2$ is shown as controlled by the valve D' operated by the handle $D^4$ which serves also to operate the valve $C^2$ through the link connection $D^5$. The valves $C^2$ and D' are normally open but are provided to cut off all communication between the steam pipe and the heater when it is desirable to cut the latter out of service. $D^2$ represents the waste pipe leading from the receptacle D and controlled by the valve $D^3$. The valve $D^3$ is operated by a float E located within the receptacle D and carried by an arm secured to a rock shaft $E^2$ journaled in the chambered head E' secured to the receptacle D. Suitable operating connections are provided between the shaft $E^2$ and the stem of the valve $D^3$. The member E', float E and means for connecting them together are similar to the member EB', float EB and means connecting them shown in Fig. 2 and hereinafter referred to.

$C^4$ represents a waste or vent pipe for vapor and excess steam leading from the upper end of the separator C, this pipe being controlled by the usual back pressure regulating valve $C^5$.

$A^7$ represents a vent pipe connecting the top of the heater tank to the pipe $C^4$ above the valve $C^5$. Advantageously a thermostatic valve $A^9$ is provided in the vent connection $A^7$, this valve being adapted to open to permit the escape of air from the heating chamber, and to close to prevent the passage of steam.

$A^8$ represents a hand valve also located in the vent pipe $A^7$, this valve, of course, being normally open when the thermostatic valve $A^9$ is employed. The vapor pressure maintained in the heater tank varies with the conditions of use, and in particular with the temperature which it is desired to give the water issuing from the heater and the pressure of the steam available for heating the water. Under ordinary conditions of use the pressure in the heater tank is ordinarily a pound or two above the pressure of the atmosphere, though it is not uncommon to have this pressure vary from a pound or two below atmospheric pressure up to ten or even twenty pounds above the atmospheric pressure.

The cold water to be heated is supplied to the heater by the pipe G which discharges into the trough H located in the upper end of the heater chamber. From the trough H the cold water overflows on to inclined baffles or spreader trays I over which the water flows in film-like and broken streams thus facilitating the rapid absorption by the cold water of heat from the steam admitted through pipe B. The pipe G is controlled by a valve G' operated by a float EA within the heater tank and carried by an arm secured to a rock shaft $EA^2$ journaled in the head EA' secured to the heater tank. The rock shaft $EA^2$ is suitably connected to the movable member of the valve G', the parts being so arranged that the valve G' will be closed when the water accumulating in the bottom of the heating chamber rises to a level somewhat below the top of the member $A^3$ while at lower heights of water level the valve G' will be open.

GA represents a supply pipe which may be employed for discharging into the heater, water of condensation from steam traps, radiators and the like.

$A^4$ represents a shell forming a chamber into which the pipe GA opens and which is open at its upper end to the heater chamber proper at a level above that of the upper end of the member $A^3$.

$A^{10}$ represents a perforated support for the filter bed F located in the lower end of the heating tank. As shown, the plate $A^{10}$ is located some distance above the bottom wall of the heater tank, thus providing a chamber $A^5$ from which the heated and purified water passes upward to the service discharge pipe J through the chamber $A^7$ formed by the shell member $A^6$, this chamber being open at its bottom to the chamber $A^5$.

$A^{11}$ represents an equalizing pipe which leads from the chamber $A^7$ to a point in the heater chamber above the maximum height of water level occurring therein in normal operation.

The heater proper, shown by the drawings and described above, does not in itself possess any novel features, but is of a type well known and long in common use.

The discharge pipe J from the heater A leads to a closed weir chamber K, opening to the latter on the supply side of the weir K' located within the weir chamber. As shown, the weir K' is formed with a plurality of V-shaped notches or orifices $K^2$ in its upper edge, the apices of these orifices being all at the same level.

$K^3$ represents a baffle arranged in the weir chamber between the mouth of the pipe J and the weir $K^2$ and advantageously perforated as shown in its lower portion. The purpose of the baffle $K^3$ is to insure a quiet flow of water to the weir proper and an avoidance of eddy currents in the water on the supply side of the weir. The flow of water from the heater tank into the weir chamber is controlled by a valve J' located in the pipe J and operated by the float EB located within the weir chamber on the discharge side of the weir. The float EB is carried by an arm secured to a rock shaft $EB^2$ journaled in the chambered head EB' secured to the side of the weir chamber. The shaft $EB^2$ has an arm $EB^3$ connected to the stem of the valve J' through link $EB^4$, the arrangement being such that on a predetermined rise of water level on the discharge side of the weir, the corresponding elevation of the float EB will close the valve J' while with a lower water level on the discharge side of the weir the valve J' will be held open.

$K^4$ represents a pipe, opening to the weir chamber at the top of the latter, and to the heater above the water level therein. This pipe is employed to equalize the vapor pressure in the weir chamber and heater. This pipe may be closed when desired by the manually actuated valve $K^5$ and the pipe J may also be closed when desired by the manually actuated valve $J^2$.

$K^6$ represents the service discharge pipe leading from the outlet compartment of the weir chamber, and through which the heated—and measured—water is delivered for use to a boiler feed pump, laundry tubs or the like.

With weir measuring apparatus of the character described it is well known that the rate of flow over the weir is a function of the height of water level on the supply side of the weir. Where the weir is formed with a V-shaped orifice or orifices, such as the orifices $K^2$, the flow is proportional to the five-halves power of the height of water level on the supply side of the weir above the level of the weir notch apex or apices, i. e. if $(h)$ represents this height, the quantity rate of flow, $(q)$ of liquid over the weir is given by the equation $$q = ah^{5/2},$$

where $(a)$ is a constant. The flow of water over the weir may thus be measured by measuring the varying accumulation of water on the supply side of the weir.

The invention claimed herein is independent of the character of the particular means employed for determining the rate of flow over the weir from the varying accumulation of water on the supply side of the weir. The particular means for this purpose, partially disclosed herein, is more fully disclosed and is claimed in my application Serial No. 746,280 filed February 5th, 1913, as a division of this case. Other suitable forms of mechanism for measuring the varying accumulation of water on the supply side of a weir and for indicating, recording and registering the flow of liquid in ordinary quantity, i. e. volume or weight units of measurement are disclosed and claimed in my prior Patent 1,015,556, granted January 23rd, 1912, and in my co-pending application Serial No. 670,863, filed January 12, 1912.

With the particular form of apparatus disclosed by the present application, I measure the flow of water over the weir by means of a bucket Q suspended in the weir chamber on the discharge side of the weir with the bottom of the cavity in the bucket located at the level of the weir notch apices. The interior of the bucket Q is connected to the supply side of the weir below the level of the weir notch apices by a flexible pipe $Q^2$ which may be formed of rubber hose. With this arrangement it is obvious that the bucket will be filled with water at all times to the level of the water on the supply side of the weir, and those skilled in the art will understand that the weight of the bucket and its contents will be a function of the rate of flow over the weir. Preferably I shape the interior surface of the bucket so that the weight of the water contained by it will bear a constant ratio to the rate of flow over the weir as the height of water level on the supply side of the weir rises and falls. Those skilled in the art will have no difficulty in determining the shape to be given to the inner surface of the bucket Q in order to obtain the desired proportional readings when the law governing the flow over the particular weir with which the bucket is to be used is determined, as it may be, both theoretically and experimentally, by methods well known to those skilled in the art.

In the apparatus disclosed fluid pressure means are employed for measuring the varying weight of the water contained in the bucket Q, the gage W being employed to measure the fluid pressure required to balance the weight of the bucket Q and its contents, as is explained in my said divisional application.

With the water heating and measuring apparatus disclosed it will be apparent that the heater employed may be of any convenient type now in common use and may perform its usual functions, while the weir measuring apparatus disclosed forms a satisfactory means for measuring the water discharged from the heater and utilized. The float EB in the weir chamber and the valve J' controlled by it, prevents an accumulation of water on the outlet side of the weir sufficient to interfere with the flow over the weir and thereby change the law of flow over the weir. When the service discharge connection from the heater to the weir chamber is closed by float EB and valve J' the water storing capacity and water supply regulating and waste provisions of the heater proper are brought into play serving on the one hand to avoid an undesirable waste of water on a temporary interruption, for instance, in the operation of a boiler feed pump supplied from the weir chamber, and on the other hand to check the supply of cold water to the heater and to dispose of surplus water through the waste provisions when the accumulation of water in the heater has reached a predetermined maximum. Preferably the heating apparatus is so adjusted that a considerable amount of water passing into the heater through the return connection GA after the valve G' is closed, may accumulate in the storage space between the level at which the valve G' closes and the overflow level, which is the level of the top of the member $A^3$, before the discharge of surplus water to waste commences.

The vapor equalizing connection $K^4$ between the heater and the weir chamber permits the heater to be operated at any desired internal pressure and temperature without interfering with the operation of the measuring apparatus; and in case the pressure in the heater is above atmospheric pressure, the pipe $K^4$ prevents the loss of head and reduction in temperature of the water in the weir chamber which would result if the pressure in the weir chamber was below that in the heater, and while the pressure in the heater is below atmospheric pressure, the flow of water out of the heater into the weir chamber is not thereby interfered with.

While in accordance with the provisions of the statutes I have illustrated and described the best form of my invention now known to me, it will be apparent to those skilled in the art that changes may be made in the form of the apparatus disclosed without departing from the spirit of my invention and that under some conditions certain features of my invention may be used with advantage without a corresponding use of other features.

Having now described my invention, what I claim as new and desire to secure by Letters Patent, is:

1. In a combined water heating and measuring apparatus the combination of an open heater comprising a heating chamber, steam and water supply connections thereto and a float within the heater controlling said water supply connection, a closed weir chamber, a water supply connection to the weir chamber leading from the heating chamber, an equalizing connection between the vapor spaces in the heater and weir chambers, a water discharge connection leading from the weir chamber, a weir within said chamber between the water supply and discharge connections thereto, means responsive to the accumulation of water in the discharge side of the weir for closing the water supply connection to the weir chamber, and provisions for measuring the water flowing over the weir.

2. In a combined water heating and measuring apparatus the combination of an open heater comprising a heating chamber, steam and water supply connections thereto, a float within the heater controlling said water supply connection and provisions for passing to waste surplus water accumulating in said heating chamber, a closed weir chamber, a water supply connection to the weir chamber leading from the heating chamber, an equalizing connection between the vapor spaces in the heater and weir chambers, a water discharge connection leading from the weir chamber, a weir within said chamber between the water supply and discharge connections thereto, means responsive to the accumulation of water on the discharge side of the weir for closing the water supply connection to the weir chamber, and provisions for measuring the water flowing over the weir.

3. In a combined water heating and measuring apparatus the combination of an open heater comprising a heating chamber, steam and main and auxiliary water supply connections thereto, a float within the heater controlling said main water supply connection and provisions for passing to waste surplus water accumulating in said heating chamber, a closed weir chamber, a water supply connection to the weir chamber leading from the heating chamber, an equalizing connection between the vapor spaces in the heater and weir chambers, a water discharge connection leading from the weir chamber, a weir within said chamber between the water supply and discharge connections thereto, means responsive to the accumulation of water on the discharge side of the weir for closing the water supply connection to the weir chamber, and provisions for measuring the water flowing over the weir.

4. In a combined water heating and measuring apparatus the combination of an open heater comprising a heating chamber, steam and water supply connections thereto, a float within the heater controlling said water supply connection, provisions regulating the vapor pressure in said heating chamber comprising a vent connection to the atmosphere and a back pressure regulating valve controlling the flow through said vent connection, a closed weir chamber, a water supply connection to the weir chamber leading from the heating chamber, an equalizing connection between the vapor spaces in the heater and weir chambers, a water discharge connection leading from the weir chamber, a weir within said chamber between the water supply and discharge connections thereto, means responsive to the accumulation of water on the discharge side of the weir for closing the water supply connection to the weir chamber, and provisions for measuring the water flowing over the weir.

GEO. H. GIBSON.

Witnesses:
 JOHN HARVEY SHERMAN,
 ROBERT G. CLIFTON.